US006955103B2

(12) United States Patent
Crack

(10) Patent No.: US 6,955,103 B2
(45) Date of Patent: Oct. 18, 2005

(54) KICKDOWN MEMBER FOR PEDAL ASSEMBLY

(75) Inventor: David J. Crack, Chelmsford (GB)

(73) Assignee: Teleflex Incorporated, Plymouth Meeting, PA (US)

( * ) Notice: Subject to any disclaimer, the term of this patent is extended or adjusted under 35 U.S.C. 154(b) by 232 days.

(21) Appl. No.: 10/354,534

(22) Filed: Jan. 30, 2003

(65) Prior Publication Data

US 2004/0149071 A1 Aug. 5, 2004

(51) Int. Cl.[7] .................................................. G05G 1/14

(52) U.S. Cl. ........................................... 74/512; 74/527

(58) Field of Search .......................... 74/512, 513, 560, 74/514, 527, 529, 531, 532, 534, 502.4, 802.6

(56) References Cited

U.S. PATENT DOCUMENTS

| | | | | |
|---|---|---|---|---|
| 3,643,525 A | | 2/1972 | Gibas | |
| 4,070,914 A | * | 1/1978 | Reinhardt et al. | 74/473.11 |
| 4,429,589 A | | 2/1984 | Stocker | |
| 4,646,582 A | * | 3/1987 | Kijima | 74/473.33 |
| 4,651,595 A | | 3/1987 | Miyawaki | |
| 5,477,742 A | * | 12/1995 | Burger | 74/473.26 |
| 5,697,253 A | | 12/1997 | Papenhagen et al. | |
| 5,769,754 A | | 6/1998 | Kil | |
| 5,806,376 A | | 9/1998 | Papenhagen et al. | |
| 5,855,146 A | | 1/1999 | Papenhagen et al. | |
| 5,934,152 A | | 8/1999 | Aschoff et al. | |
| 6,070,490 A | | 6/2000 | Aschoff et al. | |
| 6,209,418 B1 | | 4/2001 | Kalsi et al. | |
| 6,298,748 B1 | * | 10/2001 | Rixon et al. | 74/512 |
| 6,305,239 B1 | * | 10/2001 | Johansson et al. | 74/512 |
| 6,305,240 B1 | | 10/2001 | Hannewald et al. | |
| 6,418,813 B1 | * | 7/2002 | Lewis | 74/527 |
| 6,626,061 B2 | * | 9/2003 | Sakamoto et al. | 74/512 |
| 2002/0152831 A1 | | 10/2002 | Sakamoto et al. | 74/512 |

FOREIGN PATENT DOCUMENTS

| | | |
|---|---|---|
| EP | 0748713 | 12/1996 |

* cited by examiner

*Primary Examiner*—David A. Bucci
*Assistant Examiner*—Vicky A. Johnson
(74) *Attorney, Agent, or Firm*—Howard & Howard

(57) ABSTRACT

A pedal assembly (12) for electronically controlling an engine throttle (38). The pedal assembly (12) includes a pedal housing (14), a pedal arm (18) pivotally engaging the pedal housing (14), and an electrical generator (30) supported by the pedal housing (14). The pedal arm (18) is operable between an idle position (24) and a plurality of operable positions. When the pedal arm (18) is pivoted to a predetermined operable position (50), a kickdown member (46) provides a kickdown feel to a user. The kickdown member (46) slides within a kickdown housing (54) to provide the kickdown feel. In particular, a plurality of detent members (53*a*–53*d*) springably move into and out from a plurality of detent pockets (55*a*–55*d*) to provide the kickdown feel.

24 Claims, 9 Drawing Sheets

FIG - 3
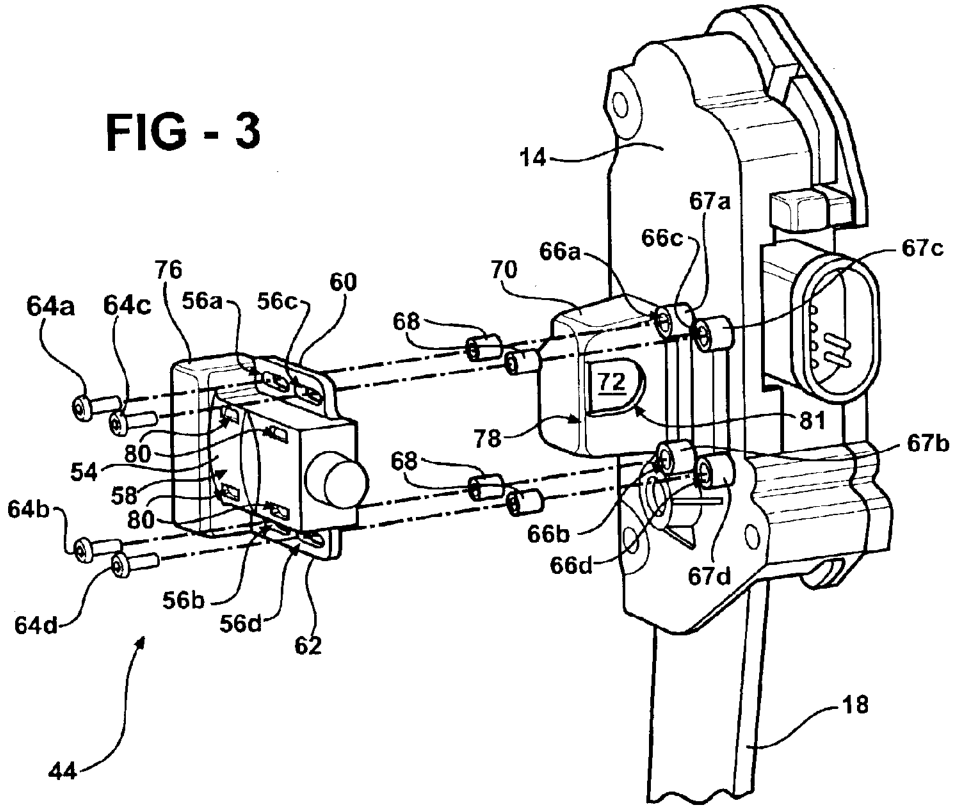
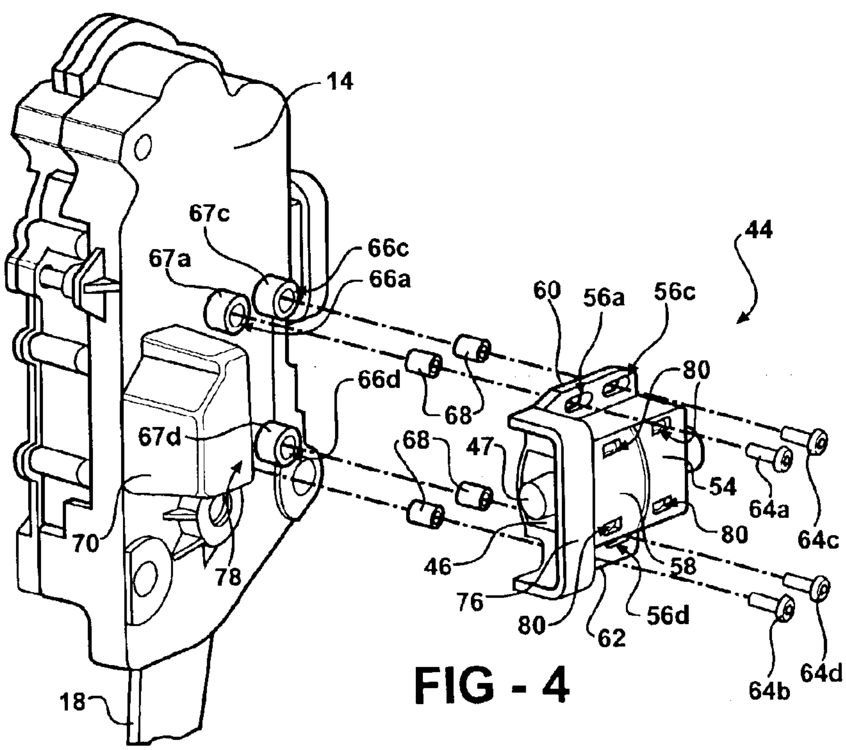
FIG - 4

FIG - 8
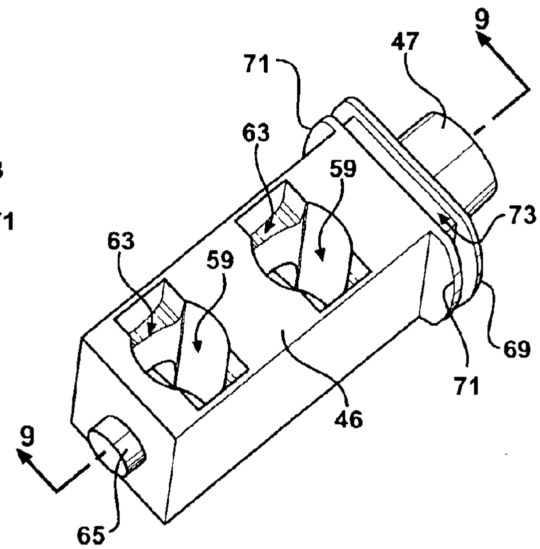
FIG - 9
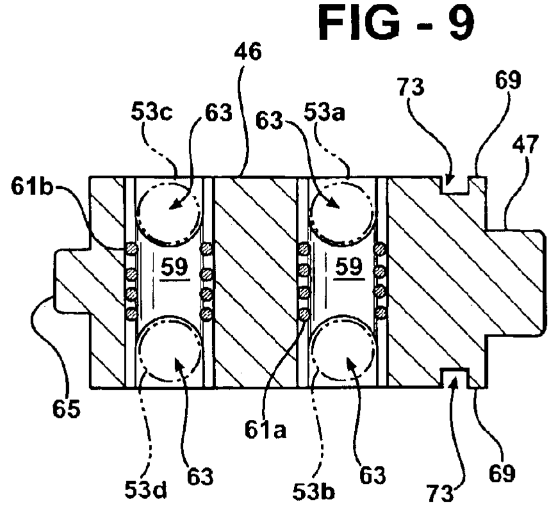
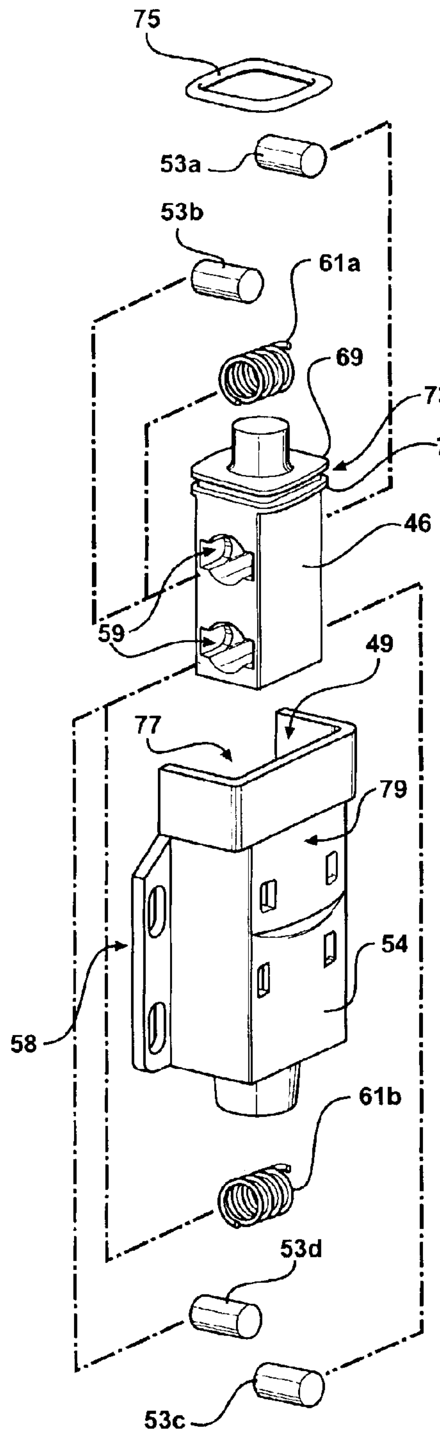
FIG - 10

KICKDOWN MEMBER FOR PEDAL ASSEMBLY

FIELD OF THE INVENTION

The present invention relates generally to a pedal assembly having a kickdown mechanism for generating a kickdown feel. Specifically, the kickdown mechanism includes a kickdown member to generate the kickdown feel.

BACKGROUND OF THE INVENTION

Prior art pedal assemblies generally comprise a pedal housing attached to a vehicle body and a pedal arm pivotally supported by the pedal housing. A series of links and levers, or cables, mechanically connect the pedal assembly to an engine throttle. Therefore, movement of the pedal arm mechanically controls a position of the engine throttle. In addition, a kickdown device is mechanically connected to the pedal assembly. The kickdown device is used to initiate a kickdown, i.e., a downshift to a next lower gear in an automatic transmission. Typically, such downshifts occur when a user desires fast acceleration. For instance, when the pedal arm is pivoted from an idle position to a predetermined operable position, the kickdown device is mechanically engaged to downshift the automatic transmission. As a result, an added force is required to further pivot the pedal arm. This added force provides a sensation to the user that is commonly referred to as a kickdown feel, i.e., the user can "feel" when the kickdown device is engaged, and hence, when the automatic transmission downshifts to the next lower gear.

Consequently, a large amount of packaging space must be provided within the vehicle to accommodate the mechanical connections to the kickdown device and the engine throttle. However, the space available for the mechanical connections is limited. Hence, recent improvements in the prior art use electrical connections in place of the mechanical connections. Instead of using the mechanical connections to mechanically transmit a position of the pedal arm to the engine throttle or kickdown device, an electrical generator is used to electrically transmit the position of the pedal arm and subsequently control the engine throttle and the kickdown. Replacing the mechanical connections with electrical connections reduces the necessary packaging space for the pedal assembly.

In prior art electronic pedal assemblies, the electrical generator generates a control signal that varies in magnitude with respect to the position of the pedal arm relative to the pedal housing. The control signal is sent to a controller that is responsive to the electrical generator. A processor in the controller uses the control signal to generate other control signals to control the position of the engine throttle and to control the downshift. In general, the downshift occurs when the control signal has a predetermined magnitude and the controller, in response, instructs the automatic transmission to downshift to the next lower gear. In other words, the controller is programmed to control the automatic transmission to downshift to the next lower gear when the control signal has the predetermined magnitude.

Unfortunately, without the mechanical connections, electronic pedal assemblies do not provide the customary feel and performance of a mechanically connected pedal assembly. In other words, the pedal assembly does not provide the kickdown feel to the user when the downshift occurs, i.e., the user cannot "feel" when the downshift occurs. To solve this problem, manufacturers incorporate a kickdown mechanism in the electronic pedal assembly to provide the kickdown feel to the user. The kickdown mechanism is markedly different than the kickdown device described above. The kickdown device is mechanically connected to the pedal assembly via a link or cable and mechanically initiates the downshift in the automatic transmission. Conversely, the kickdown mechanism does not initiate the downshift. Unlike the kickdown device, the kickdown mechanism is a stand-alone mechanism simply used to provide the kickdown feel to the user. Typically, the kickdown mechanism provides the added force associated with the kickdown feel via a kickdown member that engages a portion of the pedal arm.

An example of a kickdown device mechanically connected to the pedal assembly to initiate a downshift in an automatic transmission is shown in U.S. Pat. No. 5,697,253 to Papenhagen et al.

An example of a kickdown mechanism used in an electronic pedal assembly to provide a kickdown feel is shown in U.S. Pat. No. 6,418,813 to Lewis. The pedal assembly of the '813 patent comprises a pedal housing and a pedal arm pivotally engaging the pedal housing. A kickdown housing is attached to the pedal housing and defines a kickdown chamber for receiving a kickdown member. The kickdown member defines a recess and is slidable within the kickdown chamber between a rest position and a plurality of active positions. A rod is springably seated within the recess when the kickdown member is in the rest position and moves out of the recess when the kickdown member moves from the rest position to one of the plurality of active positions to provide the kickdown feel. A spring biases the rod into the recess. With only one rod and recess, the forces acting in a vertical plane on the kickdown member are uneven. The kickdown member is biased upwardly within the kickdown housing which may cause uneven wear on the kickdown member.

BRIEF SUMMARY OF THE INVENTION

The present invention provides a pedal assembly for use in a vehicle comprising a pedal housing and a pedal arm pivotally engaging the pedal housing and operable between a idle position and a plurality of operable positions. A kickdown housing is attached to the pedal housing and defines a kickdown chamber. A kickdown member slides within the kickdown chamber between a rest position and a plurality of active positions for engaging the pedal arm when the pedal arm is pivoted to a predetermined operable position from the idle position. A force required to further pivot the pedal arm after the pedal arm reaches the predetermined operable position is greater than a force required to pivot the pedal arm from the idle position to the predetermined operable position. First and second detent members that are opposed are movable within the kickdown housing when the kickdown member moves between the rest position and the plurality of active positions to provide a kickdown feel.

The present invention provides several advantages over the prior art. Notably, the first and second detent members provide better control of the kickdown feel than prior kickdown mechanisms. Furthermore, the first and second detent members allow for a balance of forces acting in a vertical direction between the kickdown housing and the kickdown member thereby providing a robust kickdown mechanism that is resilient to continuous and prolonged use.

BRIEF DESCRIPTION OF THE SEVERAL VIEWS OF THE DRAWINGS

Advantages of the present invention will be readily appreciated as the same becomes better understood by reference to the following detailed description when considered in connection with the accompanying drawings wherein:

FIG. 3 is an exploded view of the pedal assembly of the present invention;

FIG. 4 is an exploded view of the pedal assembly of the present invention;

FIG. 8 is a perspective view of a kickdown member of the present invention;

FIG. 9 is a cross-sectional view of the kickdown member of the present invention taken along the line 9—9 in FIG. 8; and FIG. 10 is an exploded view illustrating assembly of the kickdown member and kickdown housing.

DETAILED DESCRIPTION OF THE INVENTION

Referring to the Figures, wherein like numerals indicate like or corresponding parts throughout the several views, a pedal assembly for use in a vehicle 10 is generally shown at 12.

The pedal assembly 12 comprises a pedal housing 14. The pedal housing 14 is mounted to a vehicle structure of the vehicle 10, such as a vehicle dash, bracket or frame member 16, by means well known in the art.

Figure 1:
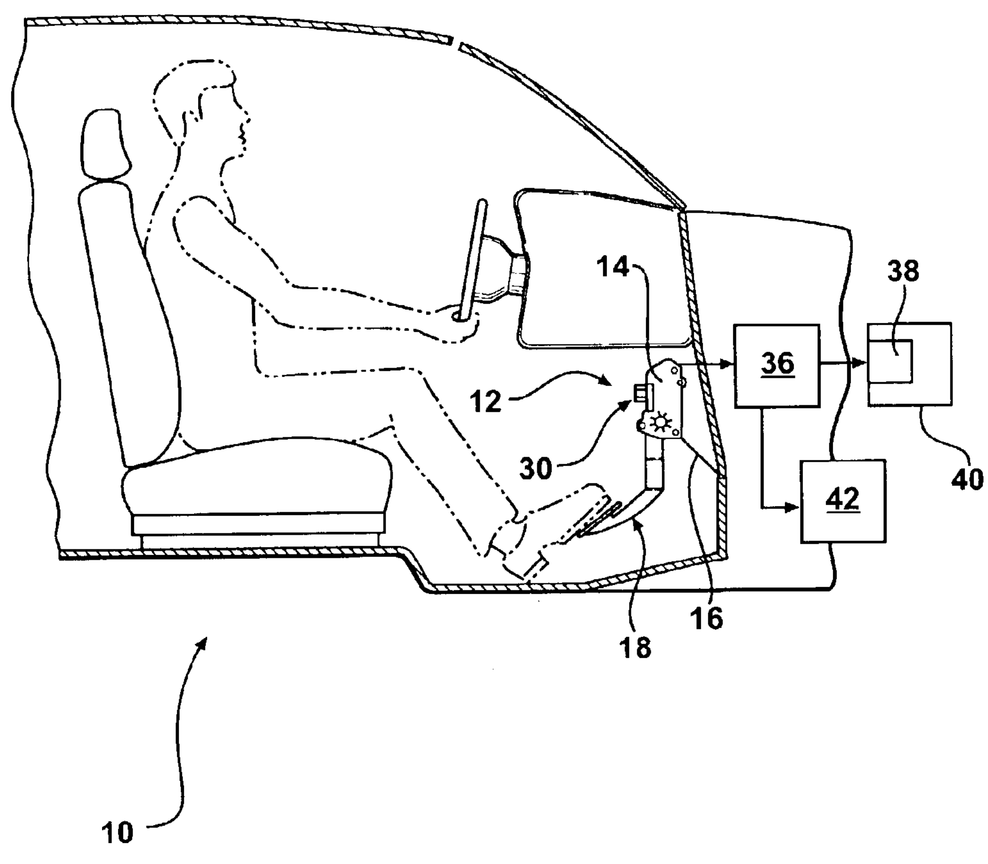
FIG. 1 is a cross-sectional view of a vehicle having a pedal assembly of the present invention further illustrating an electrical connectivity of the pedal assembly with a controller, engine throttle, and automatic transmission.
Figure 2:
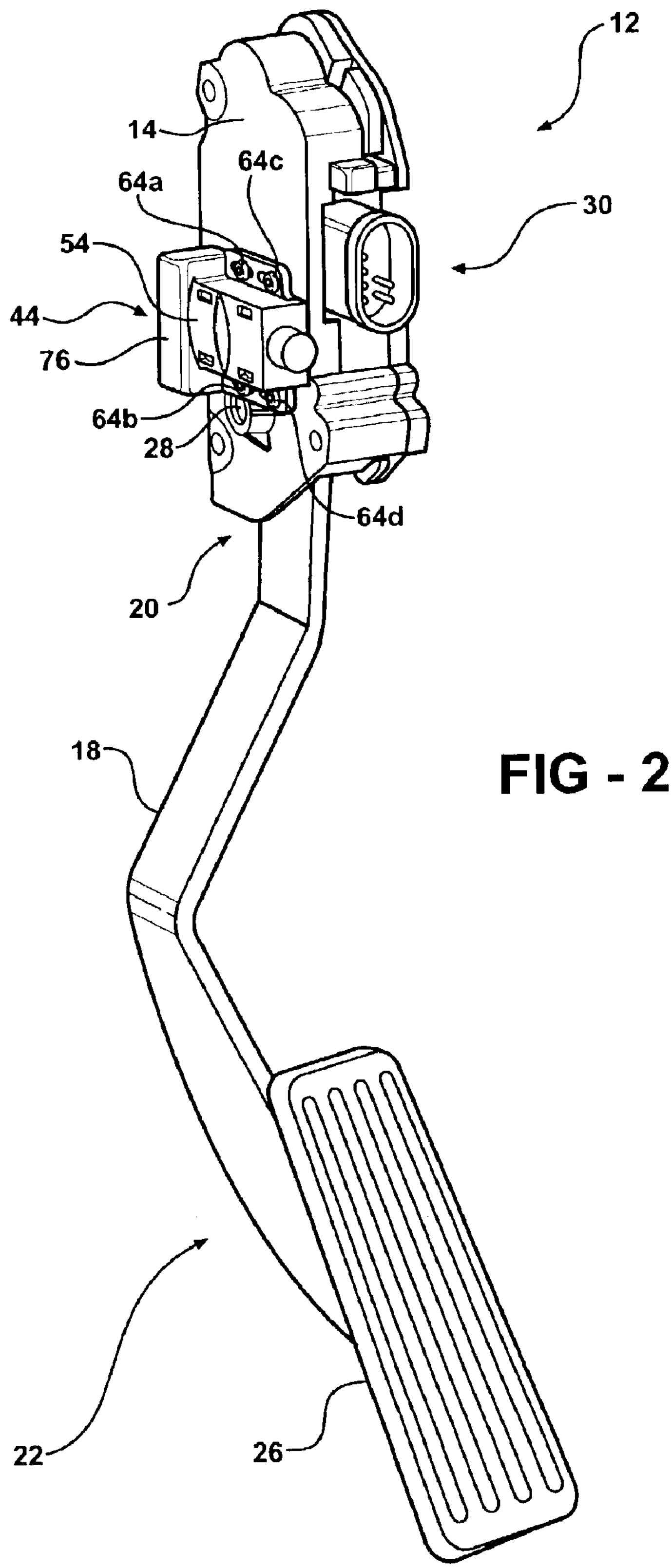
FIG. 2 is a perspective view of the pedal assembly of the present invention.

Referring to FIGS. 1 and 2, a pedal arm 18 having upper 20 and lower 22 ends pivotally engages the pedal housing 14. The pedal arm 18 is movable between an idle position 24 and a plurality of operable positions. A pedal pad 26 is connected to the lower end 22 of the pedal arm 18. The upper end 20 of the pedal arm 18 is pivotally attached to the pedal housing 14 by a pivot shaft or pin 28. The pedal arm 18 is preferably formed from steel or polymeric material and the pedal housing 14 is preferably made from a polymeric material such as nylon. It should be appreciated, however, that the material used in the pedal assembly 12 is not intended to limit the present invention.

Figure 6C:
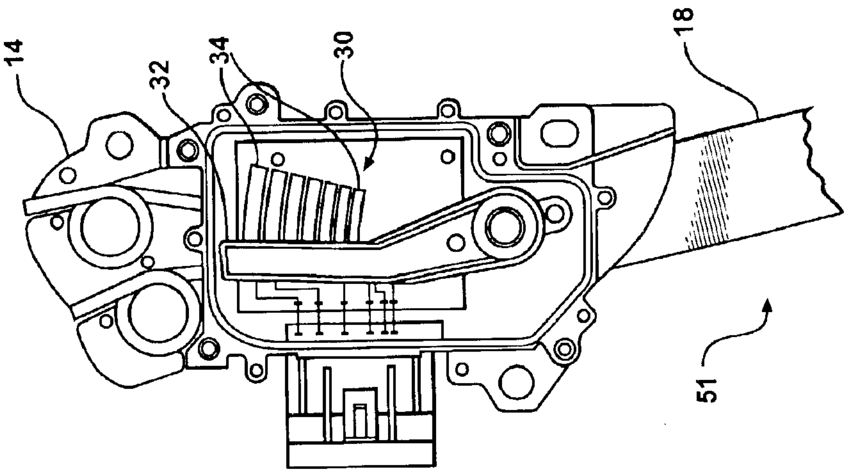
FIG. 6C is a cross-sectional view of the pedal assembly illustrating the electrical generator of the pedal assembly when the pedal arm is at the maximum travel position.
Figure 6B:
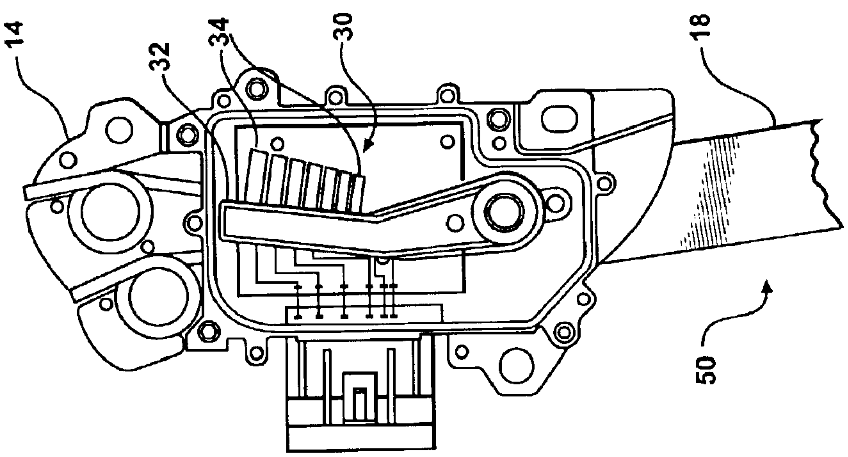
FIG. 6B is a cross-sectional view of the pedal assembly illustrating the electrical generator of the pedal assembly when the pedal arm is at the predetermined operable position.
Figure 6A:
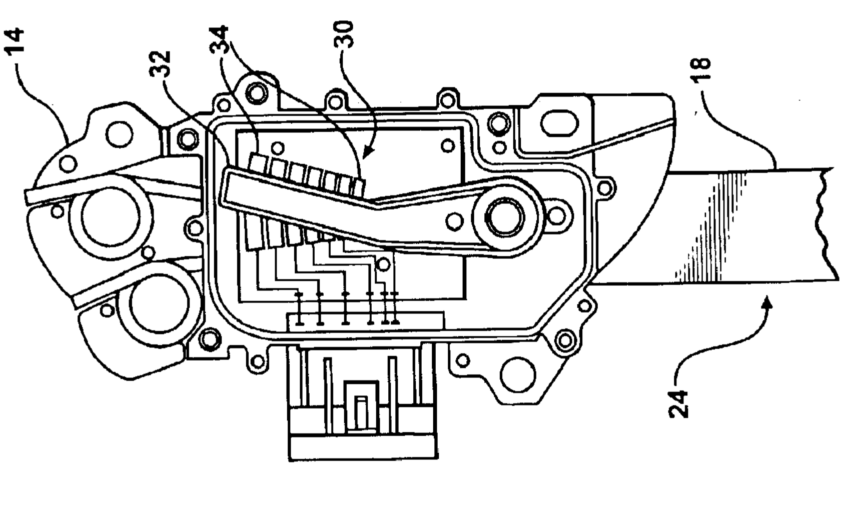
FIG. 6A is a cross-sectional view of the pedal assembly illustrating an electrical generator of the pedal assembly when the pedal arm is at the idle position.

The pedal housing 14 supports an electrical generator 30. The electrical generator 30 is best shown in FIGS. 6A–6C. The electrical generator 30 generates a control signal that varies in magnitude in proportion to the extent of movement of the pedal arm 18 relative to the pedal housing 14. The electrical generator 30 is typically a potentiometer. However, other generators or sensors known in the art can be used such as non-contact Hall effect sensors, and the like. In the preferred embodiment, the electrical generator 30 includes a sensing arm 32 that wipes across a plurality of sensing bands 34. The magnitude of the control signal varies as the sensing arm 32 moves across the sensing bands 34, i.e., the sensing bands 34 are resistors and the control signal varies as the resistance varies.

Referring back to FIG. 1, the control signal is sent to a controller (not shown) having a computer processor 36 that uses the control signal to control an engine throttle 38. When the controller receives the control signal from the electrical generator 30, the processor 36 generates a second control signal to control the position of the engine throttle 38. These control signals are communicated along electrical connections, as is well known in the art. The engine throttle 38 regulates the amount of fuel that enters a vehicle engine 40 based on the varying control signal sent from the electrical generator 30. The vehicle engine 40 is mechanically connected to an automatic transmission 42 that is shiftable between high and low gear positions. The vehicle engine 40 supplies varying power to the automatic transmission 42, which controls the magnitude of output speed and torque. Hence, the output speed and torque are dependent on the control signal that represents a position of the pedal arm 18.

Occasionally, a user will desire fast acceleration, which requires the automatic transmission 42 to downshift to a next lower gear. Downshifting of the automatic transmission 42 can be accomplished by any means known in the art, including by electrical or mechanical control. In the preferred embodiment, the downshift occurs when the control signal generated by the electrical generator 30 has a predetermined magnitude. During operation, the controller receives the control signal having the predetermined magnitude from the electrical generator 30, and in response, the processor 36 sends a third control signal to control the automatic transmission 42 and initiate the downshift.

At the same time that the downshift occurs, a kickdown mechanism 44 imparts a kickdown feel to the user. Referring to FIGS. 5A–5C and FIGS. 8–10, the kickdown mechanism 44 includes a kickdown member 46 that engages a portion 48 of the pedal arm 18 when the pedal arm 18 is pivoted to a predetermined operable position 50 (See FIG. 5B) from the idle position 24 (See FIG. 5A). More specifically, the portion 48 of the pedal arm 18 engages a projection 47 of the kickdown member 46 when the pedal arm 18 is pivoted to the predetermined operable position 50 from the idle position 24. The projection 47 is preferably cylindrical in shape with a rounded engaging end that contacts the portion 48 of the pedal arm 18.

During operation of the pedal assembly 12, a force required to further pivot the pedal arm 18 after the pedal arm 18 reaches the predetermined operable position 50 and engages the projection 47 is greater than a force required to pivot the pedal arm 18 from the idle position 24 to the predetermined operable position 50. Hence, the kickdown member 46 provides the kickdown feel. The kickdown feel is imparted to the user's foot at the pedal pad 26. Preferably, the kickdown feel occurs when the pedal arm 18 achieves nearly full travel, i.e., close to a maximum travel position 51 (See FIG. 5C). However, other activation points can be utilized.

Figure 5A:
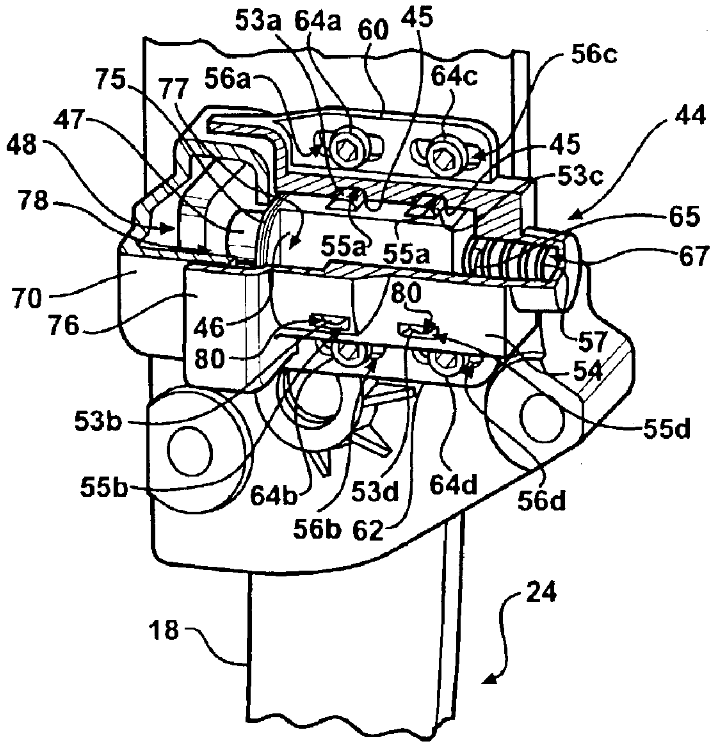
FIG. 5A is a perspective cut-away view of the pedal assembly of the present invention illustrating an idle position of a pedal arm.
Figure 5B:
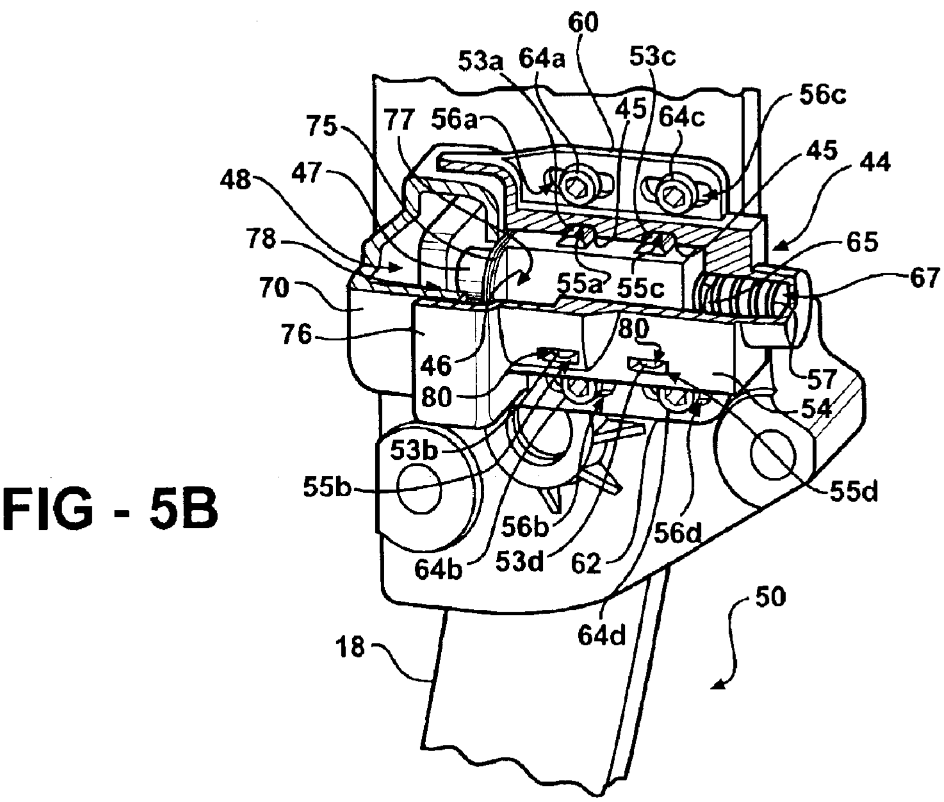
FIG. 5B is a perspective cut-away view of the pedal assembly of the present invention illustrating a predetermined operable position of the pedal arm.
Figure 5C:
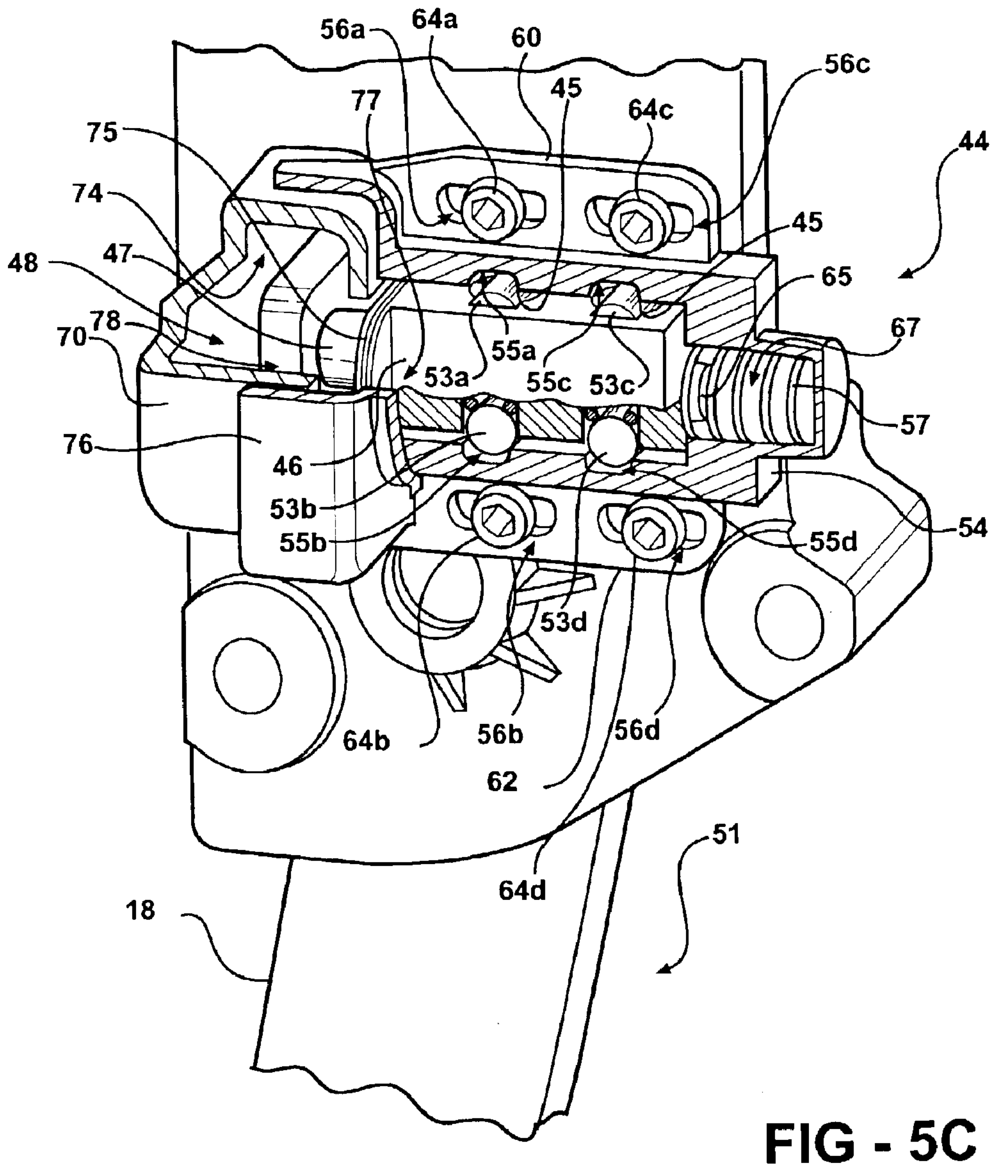
FIG. 5C is a perspective cut-away view of the pedal assembly of the present invention illustrating a maximum travel position of the pedal arm.

FIGS. 5A–5C and 6A–6C illustrate the pedal arm 18 moving between the idle position 24 and the predetermined operable position 50 and between the predetermined operable position 50 and the maximum travel position 51. In particular, FIG. 5A shows the pedal arm 18 in the idle position 24. Here, the portion 48 of the pedal arm 18 has not yet contacted or engaged the kickdown member 46. FIG. 5B shows the pedal arm 18 in the predetermined operable position 50. In this position, the portion 48 of the pedal arm 18 has just engaged the kickdown member 46, thus initiating the kickdown feel. FIG. 5C shows the pedal arm 18 in the maximum travel position 51. Here, the downshift has already occurred and the user has already experienced the kickdown feel via movement of the kickdown member 46, as will be described further below. FIGS. 6A–6C further illustrate positions of the sensing arm 32 that correspond to the positions 24,50,51 of the pedal arm 18.

The kickdown mechanism 44 further includes a kickdown housing 54 near the pedal arm 18. In the preferred embodiment, the kickdown housing 54 is attached to the pedal housing 14 and substantially encloses the kickdown member 46. Referring briefly back to FIGS. 3 and 4, the kickdown housing 54 includes a main portion 58 and upper 60 and lower 62 flanges connected to the main portion 58 and extending upwardly and downwardly from the main portion 58. Both the kickdown housing 54 and kickdown member 46 are preferably injection molded from polymeric material. Of course, other materials and/or processes could be utilized. Referring to FIG. 10, the kickdown housing 54 has a generally rectangular shape and defines a generally rectangular kickdown chamber 49 to receive the kickdown member 46. The kickdown member 46 includes a front end and a biased end and is generally rectangular in shape.

A flange 69 surrounds the projection 47 at the front end of the kickdown member 46, as best shown in FIGS. 8 and 9. A pair of diametrically opposed curved flanges 71 are spaced from the flange 69 and front end on opposite sides of the kickdown member 46. The flange 69 and curved flanges 71 define a seal groove 73 therebetween. The flange 69 and seal groove 73 are generally in the shape of two diametrically opposed parallel sides interconnecting two diametrically opposed curved sides. A seal ring 75 having a similar shape is seated within the seal groove 73, as shown in FIGS. 5A–5C. The kickdown chamber 49 has a front chamber 77 that matches the shape of the flange 69 and seal ring 75 for slidably receiving the seal ring 75. The kickdown housing 54 includes opposed curved portions 79 further defining the front chamber 77.

Referring to FIGS. 5A–5C, the kickdown member 46 is slidable within the kickdown housing 54. The kickdown member 46 moves between a rest position and a plurality of active positions relative to the kickdown housing 54. The force required to move the kickdown member 46 relative to the kickdown housing 54 represents the kickdown feel. In particular, detent members 53*a*–53*d* in the kickdown member 46 are springably movable into and out of detent pockets 55*a*–55*d* in the kickdown housing 54 to provide resistance to movement that generate the kickdown feel. Preferably, the detent members 53*a*–53*d* are rollers made from a polymeric material that are brightly colored, such as red or yellow.

Detent springs 61*a*,61*b* in the kickdown member 46 react between the detent members 53*a*–53*d* to bias the detent members 53*a*–53*d* into the detent pockets 55*a*–55*d*. The detent springs 61*a*,61*b* are best shown in FIG. 10. In particular, a first detent spring 61*a* reacts between first 53*a* and second 53*b* detent members that are opposed from one another to bias the first 53*a* and second 53*b* detent members into first 55*a* and second 55*b* detent pockets. A second detent spring 61*b* reacts between third 53*c* and fourth 53*d* detent members that are opposed from one another to bias the third 53*c* and fourth 53*d* detent members into third 55*c* and fourth 55*d* detent pockets.

Of course, the present invention is not limited to four detent members 53*a*–53*d* moving into and out from four detent pockets 55*a*–55*d*. In fact, the third 53*c* and fourth 53*d* detent members could be removed from the kickdown mechanism 44 such that only the first 53*a* and second 53*b* detent members provide the kickdown feel. Thus, a magnitude of the kickdown feel is variable or controllable by adding and removing detent members. Likewise, the first 61*a* and second 61*b* detent springs could have varying compressive strengths to further control the magnitude of the kickdown feel.

The detent pockets 55*a*–55*d* are preferably semi-circular shaped grooves or steps formed in the kickdown housing 54. The detent pockets 55*a*–55*d* are so shaped to closely mate with the detent members 53*a*–53*d*. The detent pockets 55*a*–55*d* are defined within upper and lower portions of the kickdown chamber 49 to provide a balance of forces acting in a vertical direction between the upper and lower portions in the kickdown chamber 49.

FIGS. 5A and 5B show the detent members 53*a*–53*d* in the detent pockets 55*a*–55*d* as the pedal arm 18 moves between the idle position 24 and the predetermined operable position 50, i.e., the kickdown member 46 is in the rest position. FIG. 5C shows the detent members 53*a*–53*d* being forced out from the detent pockets 55*a*–55*d* when the pedal arm 18 moves from the predetermined operable position 50 toward the maximum travel position 51, i.e., the kickdown member 46 has moved from the rest position to one of the active positions. The user must apply an added force to urge the detent members 53*a*–53*d* from the detent pockets 55*a*–55*d*.

A biasing mechanism 45 is attached to the kickdown housing 54 to force the detent members 53*a*–53*d* out from the detent pockets 55*a*–55*d* when the kickdown member 46 moves from the rest position to one of the plurality of active positions. The biasing mechanism 45 is further defined as biasing edges 45 of the kickdown housing 54 that urge the detent members 53*a*–53*d* from the detent pockets 55*a*–55*d*. In the preferred embodiment, four biasing edges 45, two in the upper portion and two in the lower portion of the kickdown chamber 49 bias the four detent members 53*a*–53*d* from the four detent pockets 55*a*–55*d*.

When the biasing edges 45 urge the detent members 53*a*–53*d* from the detent pockets 55*a*–55*d*, the detent members 53*a*–53*d* recess into detent member guides 63 that are formed in the kickdown member 46. This is best illustrated by the hidden lines in FIG. 9. The detent member guides 63 are sized to permit the detent members 53*a*–53*d* to fully recess within the kickdown member 46. A bottom of each detent member guide 63 has a semi-circular shape to mate with the detent members 53*a*–53*d*. Two detent member guides 63 are formed in an upper side of the kickdown member 46 and two detent member guides 63 are formed in a lower side of the kickdown member 46.

A spring bore 59 extends between each set of diametrically opposed detent member guides 63, i.e., between the detent member guides 63 in the upper side and lower sides of the kickdown member 46. The detent springs 61*a*,61*b* are seated within the spring bores 59. The detent springs 61*a*, 61*b* urge the detent members 53*a*–53*d* from the detent member guides 63 into the detent pockets 55*a*–55*d*. The detent springs 61*a*,61*b* also provide resiliency when the detent members 53*a*–53*d* are moving out from the detent pockets 55*a*–55*d* into the detent member guides 63 such as when the pedal arm 18 is moving from the predetermined operable position 50 toward the maximum travel position 51. This resiliency provides part of the kickdown feel.

Referring to FIGS. 5A–5C, a spring 57 biases the kickdown member 46 toward the portion 48 of the pedal arm 18, effectively biasing the kickdown member 46 into the rest position. The spring 57 operates between the kickdown member 46 and the kickdown housing 54. In particular, a first end of the spring 57 is seated about an embossed island 65 integrally formed with the kickdown member 46 and centrally protruding from the biased end of the kickdown member 46, while a second end of the spring 57 presses against an end of a spring pocket 67 formed in the kickdown housing 54.

The user must apply enough force to not only urge the detent members 53*a*–53*d* from the detent pockets 55*a*–55*d*, but to also overcome the biasing effect of the spring 57 when moving the pedal arm 18 from the predetermined operable position 50 toward the maximum travel position 51. When the kickdown member 46 is in one of the plurality of active positions (See FIG. 5C) and the user releases the pedal arm 18, e.g., to decelerate, the spring 57 biases the kickdown member 46 to the rest position and the detent members 53*a*–53*d* return to the detent pockets 55*a*–55*d*.

Referring to FIGS. 3 and 4, the kickdown housing 54 defines a plurality of slots 56*a*–56*d* therein to provide adjustment of the kickdown housing 54 relative to the pedal housing 14. In the preferred embodiment, the plurality of slots 56*a*–56*d* are defined in the upper 60 and lower 62 flanges.

A plurality of adjusting fasteners 64*a*–64*d* extend through the slots 56*a*–56*d* into projections 67*a*–67*d* extending from the pedal housing 14 to adjustably connect the kickdown housing 54 to the pedal housing 14. Specifically, the plurality of adjusting fasteners 64*a*–64*d* extend through the slots 56*a*–56*d* into bores 66*a*–66*d* defined within the projections 67*a*–67*d*. The kickdown housing 54 is adjusted by sliding the kickdown housing 54 relative to the pedal housing 14 along the adjusting fasteners 64*a*–64*d*. The kickdown member 46 moves with the kickdown housing 54 during adjustment. Hence, the kickdown member 46 is adjusted by sliding the kickdown housing 54 relative to the pedal housing 14.

A plurality of snug-fit bushings 68 are positioned in the bores 66*a*–66*d* in the pedal housing 14. The adjusting fasteners 64*a*–64*d* extend through the slots 56*a*–56*d* and the snug-fit bushings 68 into the bores 66*a*–66*d* to create a snug-fit between the adjusting fasteners 64*a*–64*d* and the pedal housing 14.

A pedal arm jacket 70 encloses the portion 48 of the pedal arm 18 that engages the kickdown member 46. Referring specifically to FIG. 3, the portion 48 of the pedal arm 18 is further defined as a plate 72 connected to the pedal arm 18 and the plate 72 extends perpendicularly from the pedal arm 18 into the pedal arm jacket 70 through an opening 74 (See FIG. 5C) defined between the pedal housing 14 and the pedal arm jacket 70. In addition, the kickdown member 46 engages the plate 72 through a second opening 81 (See FIG. 3) defined by the pedal arm jacket 70. The pedal arm jacket 70 is preferably made from a polymeric material. However, other materials such as steel, aluminum, and the like may be used.

The kickdown housing 54 includes a lip 76 connected to the main portion 58 that covers a portion 78 of the pedal arm jacket 70. This is best shown in FIGS. 5A–5C. The lip 76 is slidable across the pedal arm jacket 70 when the kickdown housing 54 is adjusted relative to the pedal housing 14.

Figure 7A:
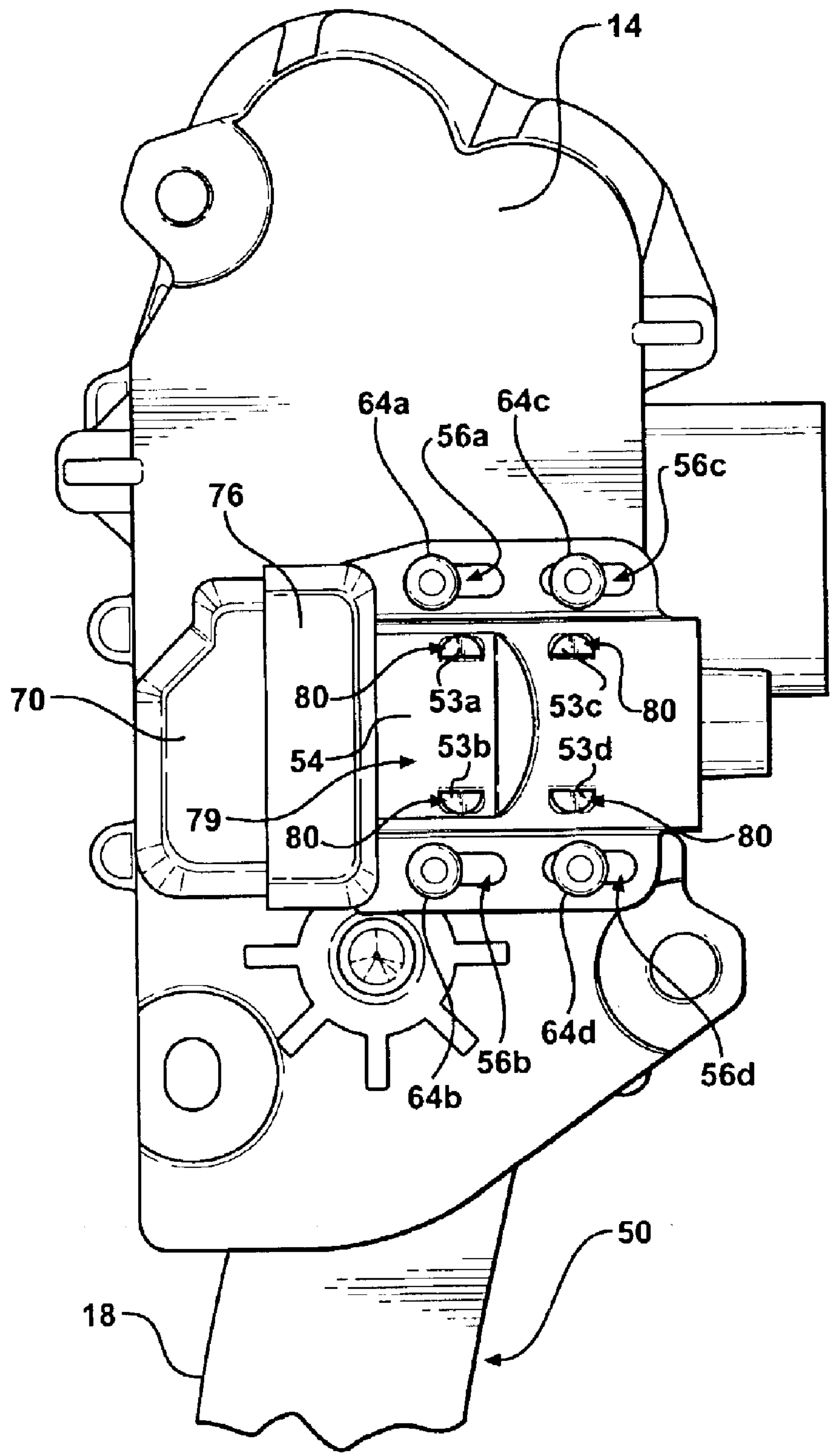
FIG. 7A is an elevational side view of the pedal assembly of the present invention when the pedal arm is at the predetermined operable position.
Figure 7B:
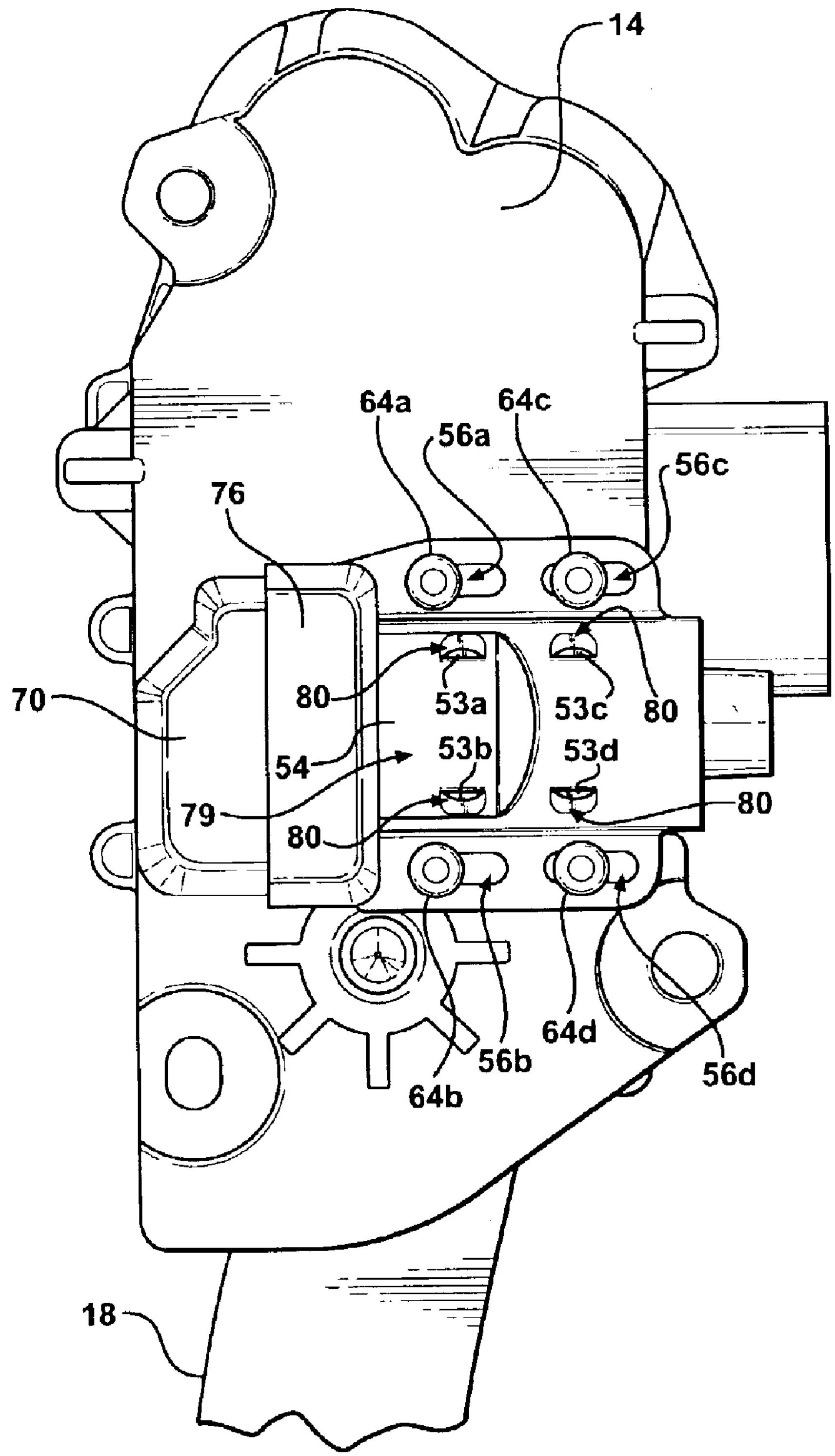
FIG. 7B is an elevational side view of the pedal assembly of the present invention when the pedal arm is at the maximum travel position.

Referring to FIGS. 7A and 7B, the kickdown housing 54 defines a plurality of indicator windows 80 therein to determine the extent of movement between the kickdown member 46 and the kickdown housing 54. In other words, the indicator windows 80 provide an indication of whether or not the kickdown member 46 has moved relative to the kickdown housing 54. The indicator windows 80 coextend with the detent pockets 55*a*–55*d*. Hence, the detent members 53*a*–53*d* should be fully viewable within the indicator windows 80 when the kickdown member 46 is in the rest position. Additionally, as previously mentioned, the detent members 53*a*–53*d* may be brightly colored to improve visibility within the indicator windows 80. FIG. 7A shows the detent members 53*a*–53*d* fully viewable within the indicator windows 80, i.e., the kickdown member 46 is in the rest position. FIG. 7B shows the kickdown member 46 moved from the rest position to one of the active positions, i.e., only a portion of the detent members 53*a*–53*d* can be seen in the indicator windows 80.

Obviously, many modifications and variations of the present invention are possible in light of the above teachings. The invention may be practiced otherwise than as specifically described within the scope of the appended claims, wherein that which is prior art is antecedent to the novelty set forth in the “characterized by” clause. The novelty is meant to be particularly and distinctly recited in the “characterized by” clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A pedal assembly (12) for use in a vehicle (10), comprising:

a pedal housing (14);

a pedal arm (18) pivotally engaging said pedal housing (14) and operable between an idle position (24) and a plurality of operable positions;

a kickdown housing (54) near said pedal arm (18) and defining a kickdown chamber (49);

a kickdown member (46) slidable within said kickdown chamber (49) between a rest position and a plurality of active positions and directly engageable by said pedal arm (18) when said pedal arm (18) is pivoted to a predetermined operable position (50) from said idle position (24) such that a force required to further pivot said pedal arm (18) after said pedal arm (18) reaches said predetermined operable position (50) is greater than a force required to pivot said pedal arm (18) from said idle position (24) to said predetermined operable position (50);

a first detent member (53*a*) movable within said kickdown housing (54) when said kickdown member (46) moves between said rest position and said plurality of active positions for providing a kickdown feel;

a second detent member (53*b*) opposed from said first detent member (53*a*) and movable within said kickdown housing (54) when said kickdown member (46) moves between said rest position and said plurality of active positions for providing the kickdown feel; and at least one detent spring (61*a*) for biasing said first and second detent members (53*a*,53*b*) away from one another.

2. An assembly as set forth in claim 1 wherein said kickdown housing (54) defines first and second detent pockets (55*a*,55*b*) and said at least one detent spring (61*a*) biases said first and second detent members (53*a*,53*b*) into said first and second detent pockets (55*a*,55*b*) when said kickdown member (46) is in said rest position.

3. An assembly as set forth in claim 2 further including third (53*c*) and fourth (53*d*) detent members springably movable into and out from third (55*c*) and fourth (55*d*) detent pockets defined by said kickdown housing (54) wherein said fourth detent member (53*d*) and said fourth detent pocket (55*d*) are opposed from said third detent member (53*c*) and said third detent pocket (55*c*).

4. An assembly as set forth in claim 3 including a second detent spring (61*b*) reacting between said third (53*c*) and fourth (53*d*) detent members for biasing said third (53*c*) and fourth (53*d*) detent members into said third (55*c*) and fourth (55*d*) detent pockets.

5. An assembly as set forth in claim 4 further including biasing edges (45) formed in said kickdown housing (54) for urging said detent members (53*a*–53*d*) from said detent pockets (55*a*–55*d*) when said kickdown member (46) moves between said rest position and said plurality of active positions.

6. An assembly as set forth in claim 5 wherein said detent pockets (55*a*–55*d*) and biasing edges (45) are defined in opposed upper and lower portions of said kickdown chamber (49) to provide a balance of forces acting in a vertical direction in said kickdown chamber (49).

7. An assembly as set forth in claim 6 therein said kickdown member (46) defines a plurality of detent member guides (63) such that said detent members (53*a*–53*d*) at least partially recess into said plurality of detent member guides (63) when said detent members (53*a*–53*d*) move out from said detent pockets (55*a*–55*d*).

8. An assembly as set forth in claim 7 wherein said plurality of detent member guides (63) are defined in opposed upper and lower sides of said kickdown member (46).

9. An assembly as set forth in claim 8 wherein said kickdown member (46) defines a pair of spring bores (59) between said plurality of detent member guides (63) in said upper and lower sides and said spring bores (59) enclose said detent springs (61*a*,61*b*).

10. An assembly as set forth in claim 9 wherein said kickdown member (46) includes a front end and a biased end and a projection (47) protrudes from said front end toward said pedal arm (18) for engaging said pedal arm (18).

11. An assembly as set forth in claim 10 said kickdown member (46) includes an embossed island (65) centrally protruding from said biased end.

12. An assembly as set forth in claim 11 further including a spring (57) having a first end seated about said embossed island (65) and a second end positioned in a spring pocket defined within said kickdown housing (54).

13. An assembly as set forth in claim 12 wherein said kickdown member (46) includes a flange (69) surrounding said projection (47).

14. An assembly as set forth in claim 13 wherein kickdown member (46) includes a pair of curved flanges (71) diametrically opposed from one another and spaced from said flange (69).

15. An assembly as set forth in claim 14 wherein said kickdown member defines a seal groove (73) defined between said flange (69) and said curved flanges (71).

16. An assembly as set forth in claim 15 further including a seal ring (75) seated within said seal groove (73).

17. An assembly as set forth in claim 16 wherein said kickdown chamber (49) includes a front chamber (77) and said seal ring (75) is slidably received in said front chamber (77).

18. An assembly as set forth in claim 17 wherein said detent members (53*a*–53*d*) are further defined as rollers (81).

19. An assembly as set forth in claim 18 wherein each of said plurality of detent pockets (55*a*–55*d*) have a semi-circular shape.

20. A kickdown mechanism (44) for use with a pedal arm (18) to provide a kickdown feel to an operator of the pedal arm (18), comprising:

a kickdown housing (54) defining a kickdown chamber (49) and a plurality of detent pockets (55*a*–55*d*);

a kickdown member (46) slidable within said kickdown chamber (49) between a rest position and a plurality of active positions for engaging the pedal arm (18) when the pedal arm (18) is pivoted to a predetermined operable position (50) from an idle position (24) such that a force required to further pivot the pedal arm (18) after the pedal arm (18) reaches said predetermined operable position (50) is greater than a force required to pivot the pedal arm (18) from the idle position (24) to the predetermined operable position (50);

a first pair (53*a*,53*b*) of opposed detent members movable within said kickdown housing (54) when said kickdown member (46) moves between said rest position and said plurality of active positions to provide the kickdown feel;

a first detent spring (61*a*) reacting between said first pair (53*a*,53*b*) of opposed detent members to bias said first pair (53*a*,53*b*) of opposed detent members away from one another and into a first pair (55*a*,55*b*) of said plurality of detent pockets (55*a*–55*d*) when said kickdown member (46) is in said rest position.

a second pair (53*c*,53*d*) of opposed detent members movable within said kickdown housing (54) when said kickdown member (46) moves between said rest position and said plurality of active positions to further provide the kickdown feel; and a second detent spring (61*b*) reacting between said second pair (53*c*,53*d*) of opposed detent members to bias said second pair (53*c*,53*d*) of opposed detent members away from one another and into a second pair (55*c*,55*d*) of said plurality of detent pockets (55*a*–55*d*) when said kickdown member (46) is in said rest position.

21. An assembly as set forth in claim 20 further including biasing edges (45) formed in said kickdown housing (54) for urging said detent members (53*a*–53*d*) from said detent pockets (55*a*–55*d*) when said kickdown member (46) moves between said rest position and said plurality of active positions.

22. An assembly as set forth in claim 21 wherein said kickdown member (46) defines a plurality of detent member guides (63) such that said detent members (53*a*–53*d*) at least partially recess into said plurality of detent member guides (63) when said detent members (53*a*–53*d*) move out from said detent pockets (55*a*–55*d*).

23. An assembly as set forth in claim 22 further including a spring (57) acting between said kickdown member (46) and said kickdown housing (54).

24. A pedal assembly (12) for use in a vehicle (10), comprising:

a pedal housing (14);

a pedal arm (18) pivotally engaging said pedal housing (14) and operable between an idle position (24) and a plurality of operable positions;

a kickdown housing (54) near said pedal arm (18) and defining a kickdown chamber (49);

a kickdown member (46) slidable within said kickdown chamber (49) between a rest position and a plurality of active positions and directly engageable by said pedal arm (18) when said pedal arm (18) is pivoted to a predetermined operable position (50) from said idle position (24) such that a force required to further pivot said pedal arm (18) after said pedal arm (18) reaches said predetermined operable position (50) is greater than a force required to pivot said pedal arm (18) from said idle position (24) to said predetermined operable position (50);

a first detent member (53*a*) movable within said kickdown housing (54) when said kickdown member (46) moves between said rest position and said plurality of active positions for providing a kickdown feel;

a second detent member (53*b*) opposed from said first detent member (53*a*) and movable within said kickdown housing (54) when said kickdown member (46) moves between said rest position and said plurality of active positions for providing the kickdown feel;

at least one detent spring (61*a*) for biasing said first and second detent members (53*a*,53*b*) away from one another; and an electrical generator (30) supported by said pedal housing (14) for generating a control signal that varies in magnitude in proportion to the extent of movement of said pedal arm (18) relative to said pedal housing (14).

* * * * *